United States Patent [19]

Ishizuka et al.

[11] Patent Number: 5,059,791
[45] Date of Patent: Oct. 22, 1991

[54] REFERENCE POSITION DETECTING DEVICE UTILIZING A PLURALITY OF PHOTO-DETECTORS AND AN ENCODER USING THE DEVICE

[75] Inventors: Koh Ishizuka; Tetsuharu Nishimura, both of Kawasaki; Osamu Kasahara, Yokohoma, all of Japan

[73] Assignee: Canon Kabushiki Kaisha, Tokyo, Japan

[21] Appl. No.: 593,477

[22] Filed: Oct. 3, 1990

Related U.S. Application Data

[63] Continuation of Ser. No. 506,540, Mar. 8, 1990, abandoned, which is a continuation of Ser. No. 415,385, Sep. 28, 1989, abandoned, which is a continuation of Ser. No. 342,625, Apr. 19, 1989, abandoned, which is a continuation of Ser. No. 2,228, Jan. 12, 1987, abandoned.

[30] Foreign Application Priority Data

Jan. 14, 1986 [JP] Japan ................. 61-005738
Jan. 14, 1986 [JP] Japan ................. 61-005739
Feb. 27, 1986 [JP] Japan ................. 61-042676

[51] Int. Cl.$^5$ ............................................. G01D 5/34
[52] U.S. Cl. ............................ 250/231.17; 250/237 G
[58] Field of Search ........ 250/231 SE, 237 G, 231.17; 33/124 A, 125 C; 341/13, 14; 356/373-375, 351, 354, 356, 358

[56] References Cited

U.S. PATENT DOCUMENTS

| | | | |
|---|---|---|---|
| 3,726,595 | 4/1973 | Matsumoto | 356/356 |
| 3,738,753 | 6/1973 | Huntley, Jr. | 356/358 |
| 3,756,723 | 9/1973 | Hock | 356/354 |
| 3,891,321 | 6/1975 | Hock | 356/356 |
| 4,263,506 | 4/1981 | Epstein | 250/231.17 |
| 4,321,531 | 3/1982 | Marshall | 250/231 SE |
| 4,489,384 | 12/1984 | Hurley et al. | 250/231 SE |
| 4,519,140 | 5/1985 | Schmitt | 33/125 C |
| 4,629,886 | 12/1986 | Akiyama et al. | 250/237 G |
| 4,631,404 | 12/1986 | Burkhardt et al. | 33/125 C |
| 4,676,645 | 6/1987 | Taniguchi et al. | 356/356 |
| 4,677,293 | 6/1987 | Michel | 250/237 G |
| 4,677,301 | 6/1987 | Tanimoto et al. | 250/548 |

FOREIGN PATENT DOCUMENTS

| | | |
|---|---|---|
| 1273210 | 7/1968 | Fed. Rep. of Germany . |
| 1814785 | 6/1970 | Fed. Rep. of Germany . |
| 3316144 | 11/1983 | Fed. Rep. of Germany . |
| 945206 | 12/1962 | United Kingdom . |
| 1276053 | 6/1972 | United Kingdom . |
| 1302762 | 1/1973 | United Kingdom . |
| 1439645 | 6/1976 | United Kingdom . |
| 1576244 | 10/1980 | United Kingdom . |

OTHER PUBLICATIONS

H. Nauman/G. Schroder, Bauelemente der Optik, Carl Hauser Verlag Muchon Wien 1983, pp. 559-563 (with English translation of pp. 559-561).

*Primary Examiner*—David C. Nelms
*Attorney, Agent, or Firm*—Fitzpatrick, Cella, Harper & Scinto

[57] ABSTRACT

A reference position detecting device comprises an optical device for directing a light beam to a pattern indicating the reference position and plural photoreceptor elements for receiving the light beam obtained through the pattern. A reference position signal is obtained from signals from the photoreceptor elements.

48 Claims, 9 Drawing Sheets

5,059,791

REFERENCE POSITION DETECTING DEVICE UTILIZING A PLURALITY OF PHOTO-DETECTORS AND AN ENCODER USING THE DEVICE

This application is a continuation of application Ser. No. 07/506,540 filed Mar. 8, 1990 which is a continuation of application Ser. No. 07/415,385 filed Sept. 28, 1989, which is a continuation of application Ser. No. 07/342,625 filed Apr. 19, 1989, which is a continuation of application Ser. No. 07/002,228 filed Jan. 12, 1987, all now abandoned.

BACKGROUND OF THE INVENTION

1. Field of the Invention

The present invention relates to a reference position detecting device for generating a reference signal for every movement or rotation by a predetermined amount of a moving object for use in an apparatus for measuring the moving status of a moving object.

The present invention also relates to an encoder for photoelectrically measuring the moving or rotating state of an object, and more particularly to an encoder in which a light beam, particularly a coherent light beam is introduced into a diffraction grating affixed on the object to form interference fringes by the interference of the diffracted lights from said diffraction grating, and a reference position signal for measuring the moving or rotating state of the object can be effectively and precisely obtained by counting the number of interference fringes.

2. Related Background Art

Recent precision equipment such as numerically controlled machine tools and steppers for semiconductor manufacture require precise position measurement of submicron order.

For such submicron measurement there is already known a linear encoder utilizing interference fringes formed by the diffracted lights from a moving object irradiated with a coherent light such as a laser beam.

Such a linear encoder is already disclosed for example in the U.S. Pat. Nos. 3,726,595 and 3,738,753, Japanese Utility Model Laid-Open 81510/1982, Japanese Patents Laid-Open 207805/1982, 19202/1982, 19203/1982 and 98302/1985.

On the other hand, a photoelectric rotary encoder has a so-called index scale structure as shown in FIG. 1, provided with a main scale 31 composed of opaque portions and translucent portions of the same pitch formed along the periphery of a disk 35 connected to a rotary shaft 30, a fixed index scale 32 composed of opaque portions and translucent portions of the same pitch as those of said main scale, and light emitting means 33 and light receiving means 34 positioned across said both index scales. In this structure the rotation of the main scale generates a signal synchronized with the pitch of the opaque and translucent portions of both scales, and said signal is subjected to frequency analysis to detect the variation in the rotary speed of the rotary shaft.

To obtain a reference position signal, the disk 35 is provided with a slit pattern 36, which functions in combination with a light source 38 and light receiving means 37.

Thus an output pulse signal is obtained for every rotation of the disk 35, and is utilized for checking the measurement error and conducting absolute measurements.

In this method, however, the light receiving means 37 receives the light only when the light beam passes through the pattern 36, and the reference position is defined when the output signal from the light receiving means 37 exceeds a predetermined level. Consequently, the reference position varies according to the moving direction of the pattern 36, and is also affected by the intensity of the light beam and the sensitivity of the light receiving means.

It is also possible to irradiate two overlapping slit arrays with incoherent light such as from a light-emitting diode and to define the reference position when the transmitted light reaches maximum. The resolving power in this method is defined by the maximum spatial frequency (minimum pitch) of the slit array, and can only be improved by employing a smaller pitch of the slits. However, the use of a smaller pitch, for example close to the wavelength of the light source, reduces the transmitted light due to diffraction, and requires a precise adjustment of the distance of two slit arrays.

SUMMARY OF THE INVENTION

In consideration of the foregoing, an object of the present invention is to provide a reference position detecting device capable of precisely detecting the reference position and a high-performance encoder provided with such device.

Another object of the present invention is to provide a reference position detecting device of a high resolving power and an encoder of a high resolving power provided with said device.

The foregoing objects can be achieved, according to the present invention, by a reference position detecting device comprising optical means for directing a light beam to a pattern indicating the reference position, and plural photosensor elements for receiving the light beam obtained through said pattern, wherein a reference position signal is obtained from signals from said plural photosensor elements.

Also, the encoder of the present invention comprises first optical means for directing a coherent light beam to a diffraction grating formed along the moving or rotating direction of an object, interference means for super posing the diffracted lights of a particular order emerging from said diffraction grating to generate interference fringes, photosensor means for photoelectrically converting said interference fringes, a pattern indicating a reference position and provided in the vicinity of said diffraction grating, second optical means for directing a light beam to said pattern, and plural photosensor elements for receiving the light beam obtained through said pattern.

DETAILED DESCRIPTION OF THE PREFERRED EMBODIMENTS

Figure 2:
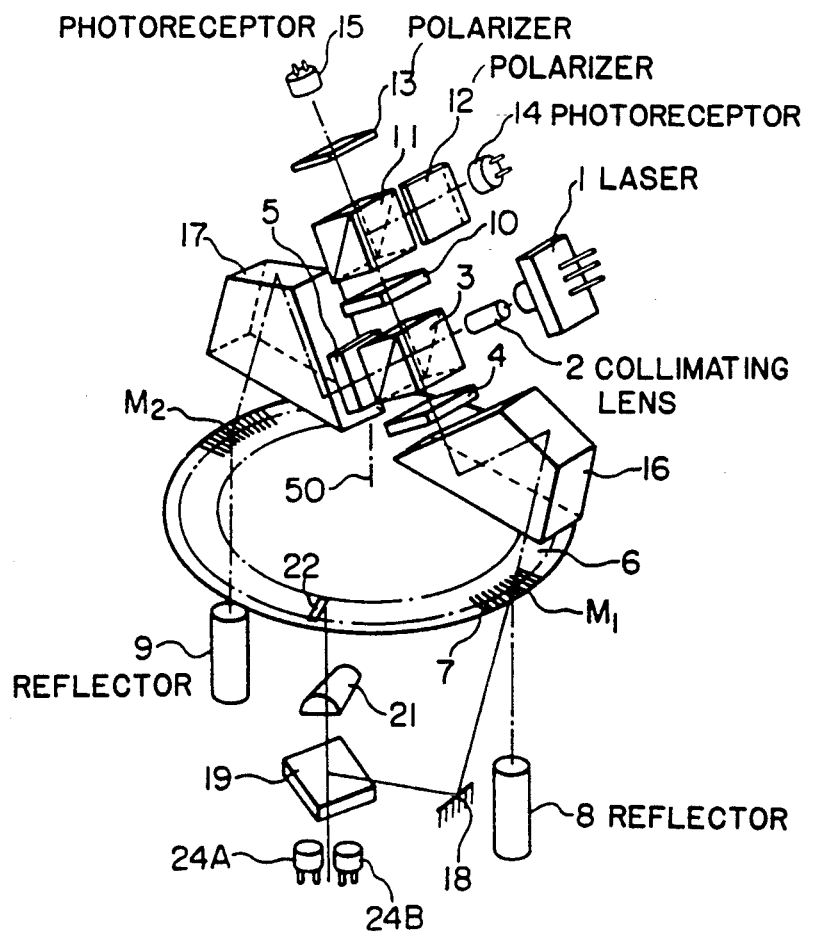
FIG. 2 is a schematic view of an encoder embodying the present invention.

FIG. 2 is a schematic view of the optical system of the present invention applied to a rotary encoder.

In this embodiment, a light beam emitted by a laser 1 is transformed into a parallel beam by a collimating lens 2 and is introduced into a beam splitter 3 to obtain two linearly polarized beams, i.e. transmitted and reflected beams, of approximately the same intensities. The reflected beam is transformed into a circularly polarized beam through a $\frac{1}{4}$-wavelength plate 4, and introduced, through a prism 16 with two reflecting faces, into a position M1 of a radial diffraction grating 7 of a disk 6 connected to a rotary object to be measured. The transmitted and diffracted light of a particular order obtained from said grating 7 is reflected by reflector means 8 to enter an approximately same position M1 of the grating 7 through the same light path. The diffracted light of a particular order obtained by re-diffraction by said grating 7 is transformed by the $\frac{1}{4}$-wavelength plate 4 into a linearly polarized beam having a polarizing direction different by 90° from that of the incident beam, and enters a polarized beam splitter 3.

Figure 3:
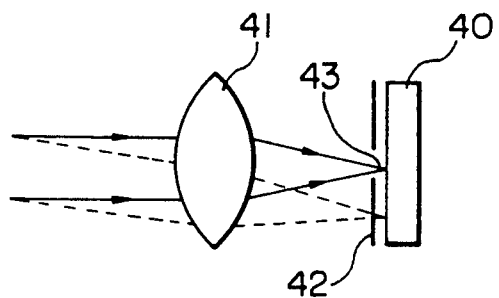
FIG. 3 is a schematic view of reflector means employed in the encoder shown in FIG. 2.

In the present embodiment, the diffracted light of the particular order travels the same light path as that of the incident beam between the polarized beam splitter 3 and the reflector means 8. FIG. 3 is a schematic view of an embodiment of the reflector means 8,9 shown in FIG. 2.

As shown in FIG. 3, a mirror 40 is positioned approximately at the focal plane of a condenser lens 41, and the diffracted light of the particular order entering said lens as a parallel beam alone is transmitted by an aperture 43 of a mask 42, reflected by said mirror 40 and returns along the incident light path, while the diffracted light of other orders is intercepted by the mask 42. The reflector means may however be composed of any other structure of a same function, for example a cat's eye optical system. Such optical system has an advantage of returning the incident beam along an approximately same path even when the diffraction angle is slightly varied by an eventual change in the oscillation wavelength of the laser.

Also the cat's eye optical system may be combined with a distributed refractive index lens, for example known under a trade name of Celfoc Micro Lens manufactured by Nippon Plate Glass Co., with a reflective layer provided on a flat face of said lens, and such combination can be effectively applied to the present invention as an optical element which is simple in structure and easy in manufacture.

Referring again to FIG. 2, the light beam transmitted by the beam splitter 3 is transformed into a circularly polarized beam by a $\frac{1}{4}$-wavelength plate 5 and enters a position M2 of the grating 7 on the disk 6, approximately symmetrical to the point M1 with respect to the rotary shaft 50. The transmitted and diffracted light of a particular order from said grating 7 is reflected by reflector means 9 similar to the reflector means 8 and enters an approximately same position M2 of said grating 7, through the same light path. The diffracted light of a particular order obtained by re-diffraction by said grating 7 is transformed by the $\frac{1}{4}$-wavelength plate 5 into a linearly polarized light having a polarizing direction different by 90° from that of the incident beam and enters the beam splitter 3.

Also in this transmitted light beam, the diffracted light of the particular order travels the same light path as the incident beam between the beam splitter 3 and the reflector means 9, as in the case of the above-explained reflected light beam. Said diffracted light is superposed with the diffracted light coming from the reflector means 8, then is transformed by a $\frac{1}{4}$-wavelength plate 10 into a circularly polarized light and is split by a splitter 11 into two light beams. These light beams are guided through polarizers 12, 13 of which polarizing directions are respectively inclined by 45° to obtain linearly polarized lights with a mutual phase difference of 90° and are introduced respectively into photoreceptor means 14, 15 for detecting the intensity of the interference fringes formed by said two light beams.

Also in the present embodiment, a light beam directly coming from the laser 1 or from an unrepresented separate light source, or a diffracted light beam, for example of -m-th or (m+1)-th order, from the position M1 of the grating 7 other than that entering the reflector means 8, for example the m-th order diffracted beam, is guided through a mirror 18 and a beam splitter 19, and is transformed into a linear light beam by a cylindrical lens 21 for entry to a reference position detecting portion 22 provided on the disk 6.

Said reference position detecting portion 22 is composed for example of a rectangular reflecting area, and a reference position signal is obtained by receiving the light transmitted by said reference position detecting portion 22 by means of photoreceptor means 24 having two photoreceptors 24A, 24B. Said photoreceptor means 24 may also be composed of a photoreceptor element having integrated two light-receiving faces. A reference signal for measuring the state of rotation of the disk 6, for example a reference signal for each turn, can be obtained in this manner.

The present embodiment reduces the influence of dusts and scars and improves the detecting precision of the reference position, through the use of a linear light beam and the use of a reflecting area of a similar shape.

Figure 4A:
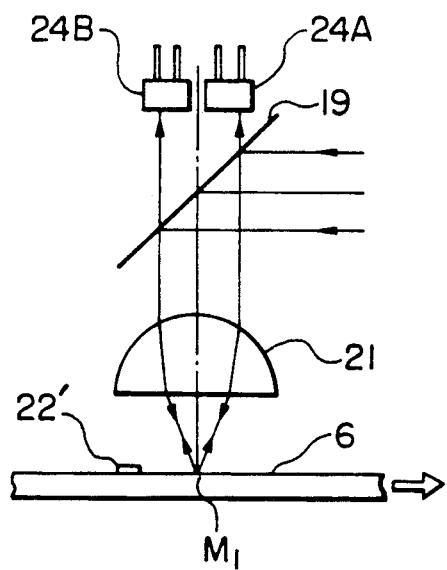
FIGS. 4A and 4B are schematic views showing the structure and working principle of a reference position detecting device employed in the encoder shown in FIG. 2.
Figure 4B:
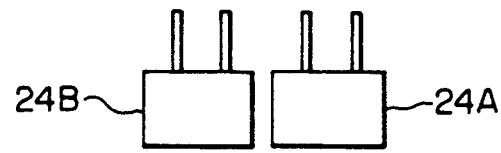

FIG. 4A is a partial detailed view showing the mode of detection of the reference position signal in the present embodiment, and FIG. 4B schematically shows a state in which the reference position detecting portion 22, consisting of a reflecting face 22' of a width P in the rotating direction has entered the focused area of a light beam of a width P'.

In the present embodiment, a part of the light beam from the laser is reflected by the beam splitter 19 and is focused, by the cylindrical lens 21, in a linear form in the vicinity of the reference position detecting portion 22 on the disk 6. Thus, focused light beam is reflected by the reflecting face 22' when the disk 6 reaches a certain position.

If said reflecting face 22' moves from left to right as shown in FIG. 4A, the initially reflected light enters the photoreceptor 24A through the cylindrical lens 21 and the beam splitter 19.

The light also enters the photoreceptor 24B as the reflecting face 22' moves further to the right. Thus at a certain moment in the course of movement of the reflecting face 22', the photoreceptors 24A and 24B receive equal amounts of light.

In the present embodiment, a position of equal output signals rom the photoreceptors 24A, 24B is taken as a reference position or a zero position, and a zero phase signal is generated at said position.

Figure 5A:
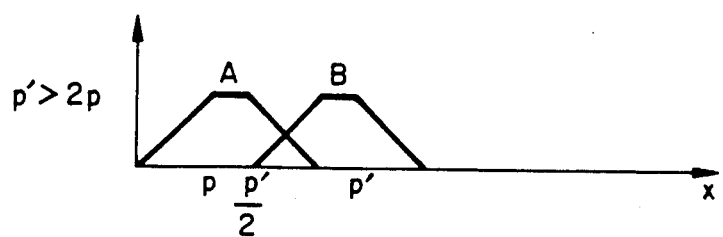
FIGS. 5A to 5E are charts showing output signals of two photoreceptors of the reference position detecting device shown in FIG. 4.
Figure 5B:
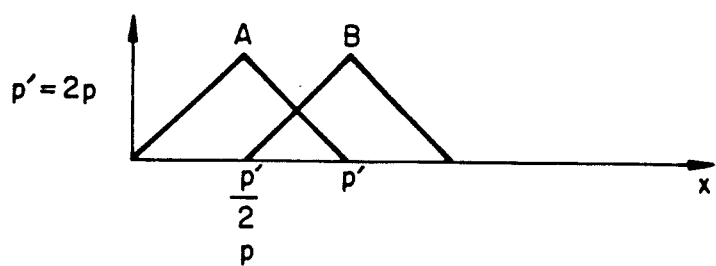
Figure 5C:
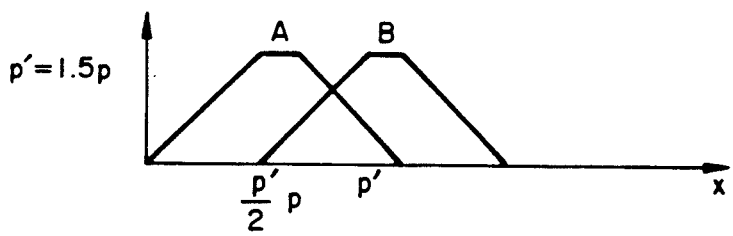
Figure 5D:
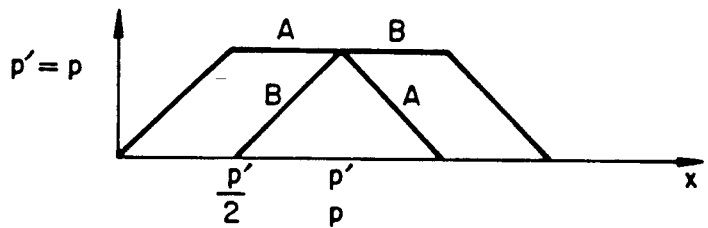
Figure 5E:
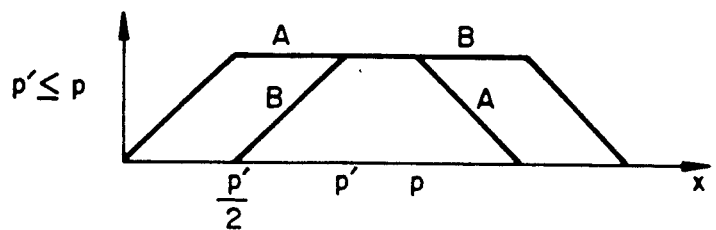

FIGS. 5A to 5E illustrate the changes in the amounts of light received by the photoreceptors 24A, 24B as a function of relative relationship of the width P' of the reflecting face 22' and the width P' of the focused light beam, wherein FIGS. 5A, 5B, 5C, 5D and 5E respectively correspond to cases of $P' > 2P$, $P' \approx 2P$, $P' \approx 1.5P$, $P' = P$ and $P' < P$. As will be apparent from FIG. 5B, a relation $P' \approx 2P$ is desirable for accurate detection of the zero position. On the other hand an accurate detection is difficult in case of $P' < P$ as shown in FIG. 5E.

Figure 4B:
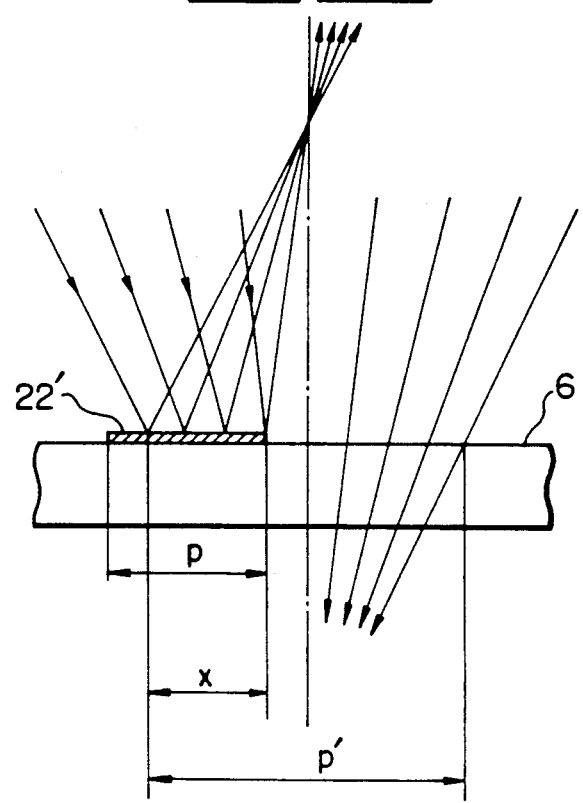
Figure 6:
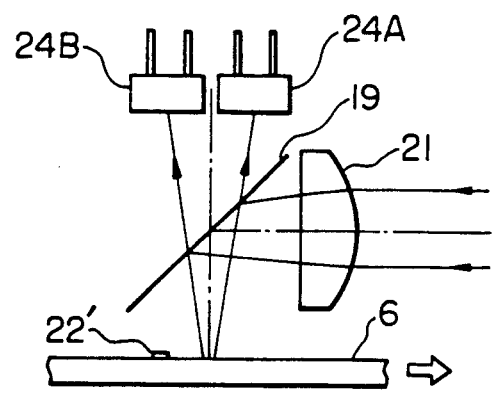
FIG. 6 is a schematic view of a second embodiment of the reference position detecting device of the present invention.

FIG. 6 shows another embodiment in which the cylindrical lens 21 is positioned in front of the beam splitter 19, namely closer to the light source. Other structures are the same as those in FIG. 4, and the same components as those in FIG. 4 are represented by the same numbers and will not be explained further.

In the foregoing embodiments the cylindrical lens may be replaced by a slit and a spherical surface lens for forming a slit-shaped light beam in the vicinity of the reference position detecting portion on the disk 6.

Also in the foregoing embodiments the incident direction of the laser beam to the disk 6 and the direction of the two photoreceptors 24A, 24B may be mutually interchanged.

Furthermore, instead of two independent photoreceptors 24A, 24B employed in the foregoing embodiments, there may be employed so-called two-divided sensor having two light-receiving faces on an element for achieving a simpler structure and a simpler adjustment. Also, instead of detecting the reflected light in a state of a parallel beam after passing the cylindrical lens, there may be provided a positive lens as will be shown in FIG. 7B for guiding a converging beam to the photoreceptors. In this manner smaller photoreceptors may be employed to achieve compactness and simplification of the apparatus.

In the foregoing embodiments a highly precise zero point detection is achieved by the combination of a slit-shaped reflecting face and a slit-shaped light beam, but there may naturally be employed a spot-shaped light beam or a reflecting or absorbing surface of another shape.

In the foregoing embodiments it is not essential to focus the laser beam by the cylindrical lens 21 to the vicinity of the reference position detecting portion 22 of the disk 6.

Figure 7A:
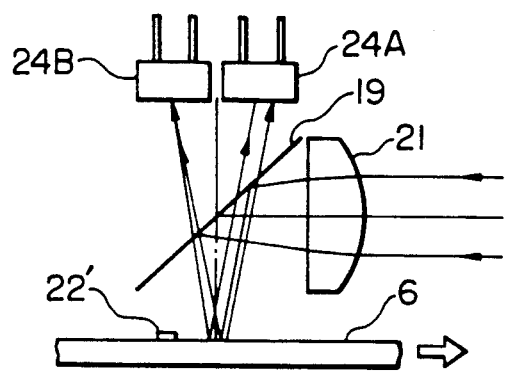
FIGS. 7A and 7B are schematic views of third and fourth embodiments of the reference position detecting device of the present invention.
Figure 7B:
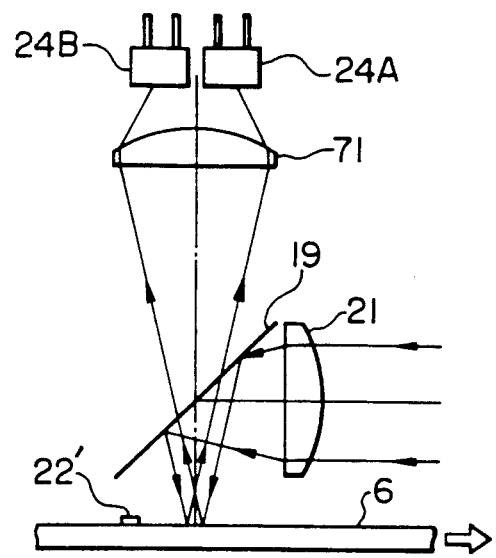

FIGS. 7A and 7B respectively illustrate third and fourth embodiments of the reference position detecting device of the present invention, wherein the same components as those in the foregoing embodiments are represented by the same numbers. There is further provided a positive condenser lens 71.

The laser beam may be converged in front of the disk 6 as shown in FIG. 7A, or beyond the disk 6 as shown in FIG. 7B, and the object of the present invention can be achieved by concentrating the reflected light beam to the photoreceptors 24A, 24B by the condenser lens 71.

Figure 8A:
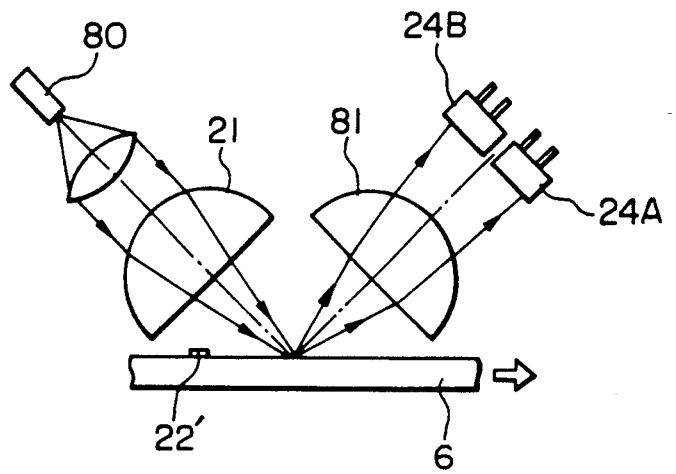
FIGS. 8A and 8B are schematic views of fifth and sixth embodiments of the reference position detecting device of the present invention.
Figure 8B:
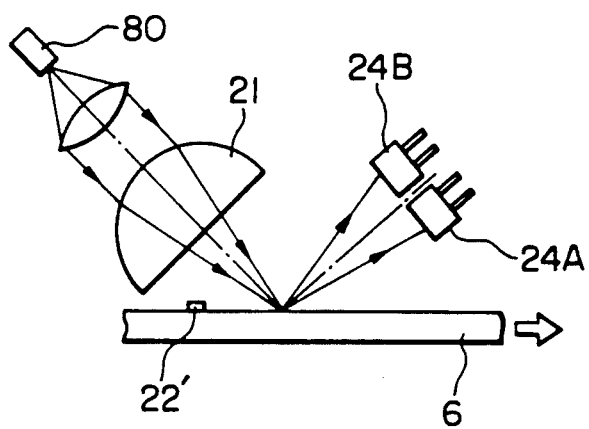

Also, for achieving efficient utilization of the light beam, it is also possible to replace the beam splitter as shown in FIG. 8A by obliquely introducing the light beam from a laser 80 onto the disk 6 through the cylindrical lens 21, and guiding the reflected light from the disk to the photoreceptors 24A, 24B through a cylindrical lens 81. Also, the cylindrical lens 81 in the embodiment shown in FIG. 8A may be dispensed with as shown in FIG. 8B.

Figure 9:
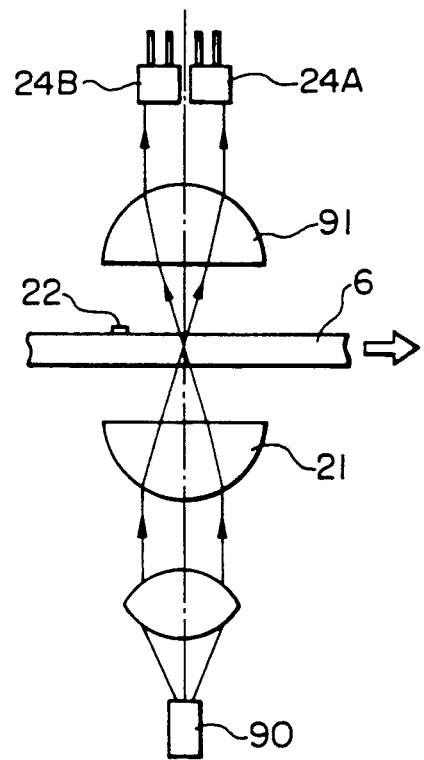
FIG. 9 is a schematic view of a seventh embodiment of the reference position detecting device of the present invention.

In the foregoing embodiments, the reference position signal is obtained from the light reflected by the reference position detecting portion 22, but a transmitted light may be utilized as shown in FIG. 9.

In the embodiment shown in FIG. 9, the laser beam from a laser 90 positioned below is guided to a transparent disk 6 through the cylindrical lens 21, and the light transmitted by the disk 6 is guided to the photoreceptors 24A, 24B through a cylindrical lens 91.

In these embodiments the light beam entering the reference position detecting portion may be shortened in the moving direction of the reference pattern, for example by an oval form or a rectangular form.

In the foregoing embodiments, the reference pattern is irradiated with a converging or diverging light beam, but the same detecting principle can be exploited with a parallel beam.

As explained in relation to FIGS. 3 to 9, the reference position detecting device of the present invention is featured by receiving the light beam from a reference pattern (reflecting face 22') moving or rotating together with the object by means of two photoreceptor elements, and releasing a zero signal when the output of said photoreceptor elements become mutually equal. Consequently, as will be understood from the foregoing embodiments, the center of the reference pattern is detected as the reference position.

Consequently, there is no dependence of the reference position on the moving direction of the pattern as in the conventional devices. Also, since said zero signal is generated by monitoring the outputs of the plural photoreceptor elements, the reference position is no longer affected by the intensity of the light beam or by the change in the sensitivity of the photoreceptor elements.

The encoder disclosed herein measures the amount of movement or rotation of an object by detecting the intensity change of interference fringes. This apparatus has resolving power of submicron order as will be explained later. Consequently, the reference position detecting device to be employed in such encoder should preferably be capable of providing a zero phase signal of resolving power comparable to that in the revolution.

The reference position detecting device of the present invention is capable of releasing a zero phase signal of such high resolving power. More specifically the width of the reference pattern in the moving direction can be made narrower according to the desired resolving power.

In the foregoing embodiments a laser beam is employed for detecting the reference position, but there may also be employed light from other light sources, for example a light-emitting diode.

However, for achieving a higher resolving power and a higher utilization of the light beam, effective is the use of a laser beam that can be satisfactorily directed and focused.

Also for compactness of the apparatus the use of a semiconductor laser is suitable.

In the following there will be explained the function of the embodiment shown in FIG. 2 as an encoder.

In said embodiment, a rotation of the object 6 to be measured by a pitch of the diffraction grating 7 causes a change of $2m\pi$ in the phase of the m-th order diffracted light. Also the phase of the n-th order diffracted light re-diffracted by the grating 7 similarly changes by $2m\pi$. Consequently the photoreceptor means in total provides $(2m-2n)$ sinusoidal wave forms, and the amount of rotation is detected in the present embodiment by detecting said sinusoidal wave forms.

As an example, in case of utilizing a diffraction grating with a pitch of 3.2 $\mu$m and utilizing the diffracted beams of first order and minus first order, a rotation of 3.2 $\mu$m of the rotary object generates four sinusoidal waves. Thus the resolving power per each sinusoidal wave is equal to $3.2/4 = 0.8$ $\mu$m or a quarter of a pitch of the diffraction grating.

The present embodiment is also capable of identifying the rotating direction of the rotary object 6 by dividing the light beam with the splitter 11 and forming a phase difference of 90° between two light beams.

The beam splitter 11, polarizers 12, 13 and a photoreceptor may be dispensed with if the measurement of the amount of rotation is enough. Also, the rotating speed can be detected by measuring the frequency of the obtained sinusoidal waves.

In the present embodiment the diffracted beams from two positions M1, M2 approximately symmetrical to the center of rotation are employed to reduce the error in measurement, resulting from the aberration between the center of rotation of the rotary object and the center of the radial diffraction grating 7.

Instead of the diffracted lights from the approximately symmetrical two points, diffracted beams from arbitrary plural positions may be utilized to achieve a substantially same effect. For example the diffracted beams from three points mutually separated by 120° can be effectively utilized.

Also, the influence of the wave front aberration resulting from the difference in pitch between the outside and the inside of the radial grating can be eliminated by superposing a beam component close to the rotary shaft with that of the other beam entering the approximately symmetrical position and similarly superposing the beam components of the outside.

In the present embodiment the diffracted light of the particular order travels the same light path as that of the incident beam between the beam splitter 3 and the reflector means 8 or 9, thereby facilitating the overlapping of two diffracted light beams on the beam splitter 3 and improving the precision of assembly of the entire apparatus.

In case the precision of measurement is not critical, there can be utilized only one light beam instead of two light beams from the mutually symmetrical two points.

In the foregoing embodiments, the ¼-wavelength plates 4, 5 may be placed at any positions between the beam splitter 3 and the reflector means.

Also in the foregoing embodiments, the photoreceptor means 14, 15 may receive reflected diffracted lights instead of transmitted diffracted lights.

Though the foregoing embodiments have been limited to rotary encoders, the technical concept of the present invention can be applied to linear encoders.

Figure 1:
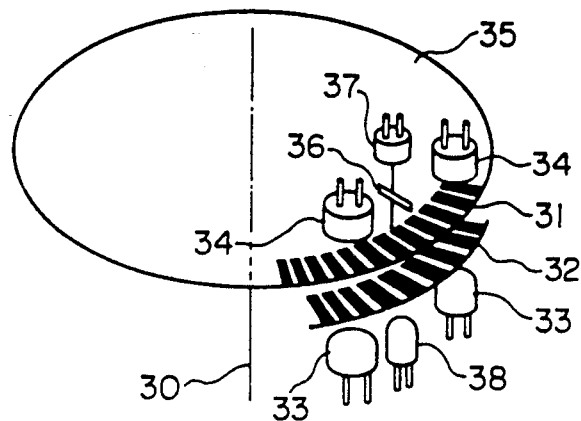
FIG. 1 is a schematic view of a conventional photoelectric rotary encoder.

Also, the reference position detecting device of the present invention is applicable not only to the encoders of the above-explained types but also to various apparatus such as a conventional photoelectric encoder as shown in FIG. 1 or a moire fringe detecting encoder.

Furthermore, the detection of the reference position in the apparatus shown in FIG. 2 is achieved by an unutilized diffracted beam, but it is also possible to provide a separate light source or to utilize a part of the light, separated by a beam splitter, from the light source for detecting the interference fringes.

The diffraction grating employed in the present encoder is a so-called amplitude type composed of opaque portions and translucent portions, or a phase type composed of portions of mutually different refractive indexes. Particularly the phase type grating can be prepared by forming relief patterns on the periphery of a transparent disk, and can be mass produced by embossing or stamping.

Thus, the present invention provides an encoder capable of easily obtaining a reference position signal of a high resolving power with a simple structure by forming a reference pattern in the moving or rotating direction of an object, introducing a light beam to said pattern and receiving the light beam transmitted or reflected at least by a part of said pattern with plural photoreceptor elements.

Figure 10:
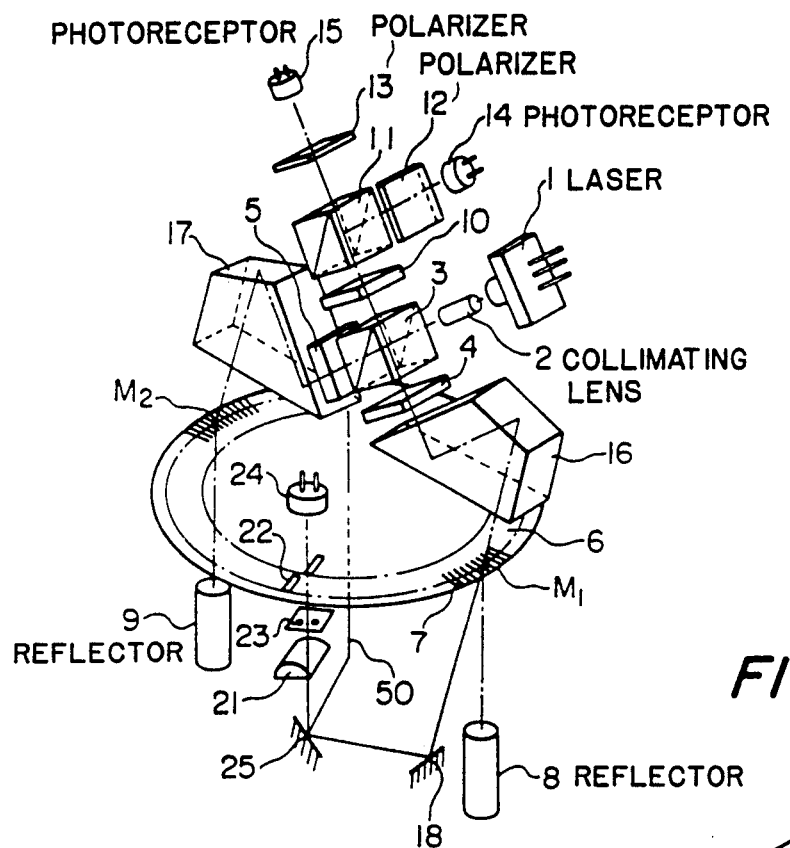
FIG. 10 is a schematic view of another embodiment of the encoder of the present invention.

FIG. 10 is a schematic view of another embodiment of the optical system of the present invention applied to a rotary encoder.

In this embodiment, a light beam emitted by a laser 1 is transformed into a parallel beam by a collimating lens 2 and is introduced into a beam splitter 3 to obtain two linearly polarized beams, i.e. transmitted and reflected beams, of approximately the same intensities. The reflected beam is transformed into a circularly polarized beam through a ¼-wavelength plate 4, and introduced, through a prism 16 having two reflecting faces, into a position M1 of a radial diffraction grating 7 of a disk 6 connected to a rotary object to be measured. The transmitted and diffracted light of a particular order obtained from said grating 7 is reflected by reflector means 8 to enter an approximately same position M1 of the grating 7 through the same light path. The diffracted light of a particular order obtained by re-diffraction by said grating 7 is transformed by the ¼-wavelength plate 4 into a linearly polarized beam, having a polarizing direction different by 90° from that of the incident beam, and enters the beam splitter 3.

In the present embodiment, the diffracted light of the particular order travels the same light path as that of the incident beam between the beam splitter 3 and the reflector means 8.

Referring again to FIG. 10, the light beam transmitted by the beam splitter 3 is transformed into a circularly polarized beam by a ¼-wavelength plate 5 and enters a position M2 of the grating 7 on the disk 6, approximately symmetrical to the point M1 with respect to the rotary shaft 50. The transmitted and diffracted light of a particular order from said grating 7 is reflected by reflector means 9 similar to the reflector means 8 and enters an approximately same position M2 of said grating 7, through the same light path. The diffracted light of a particular order obtained by re-diffraction by said grating 7 is transformed by the ¼-wavelength plate 5 into a linearly polarized light having a polarizing direction different by 90° from that of the incident beam and enters the beam splitter 3.

Also, in this transmitted light beam, the diffracted light of the particular order travels the same light path as that of the incident light beam between the beam splitter 3 and the reflector means 9, as in the case of the above-explained reflected light beam. Said diffracted light is superposed with the diffracted light coming from the reflector means 8, then is transformed by a ¼-wavelength plate 10 into a circularly polarized light and is split by a splitter 1 into two light beams. These light beams are guided through polarizers 12, 13 of which polarizing directions are respectively inclined by 45° to obtain linearly polarized lights with a mutual phase difference of 90° and are introduced respectively into photoreceptor means 14, 15 for detecting the intensity of the interference fringes formed by said two light beams.

Also in the present embodiment, a light beam diffracted from the position M1 of the grating 7, for example -m-th order or (m+1)-th order, other than the light entering the reflector means 8, for example of m-th order, is guided through mirrors 18, 25 and a cylindrical lens 21 to a mask 23 for obtaining two beams of equal intensities which are respectively introduced to a reference position detecting portion 22 formed on the disk 6.

Said detecting portion 22 is composed for example of a pair of patterns such as two slits having a phase difference in the moving direction of the disk 6, and a reference position signal is obtained by receiving the light transmitted by said grating patterns with photoreceptor means 24 having two light-receiving faces. Said photoreceptor means 24 may also be composed of two independent photoreceptor elements. In this manner there is obtained a reference signal utilized for measuring the rotating state of the disk 6, for example a reference in every turn.

Also, an error resulting from the fluctuation in the intensity of the light source is avoided by dividing the light beam from a light source in two.

Figure 11:
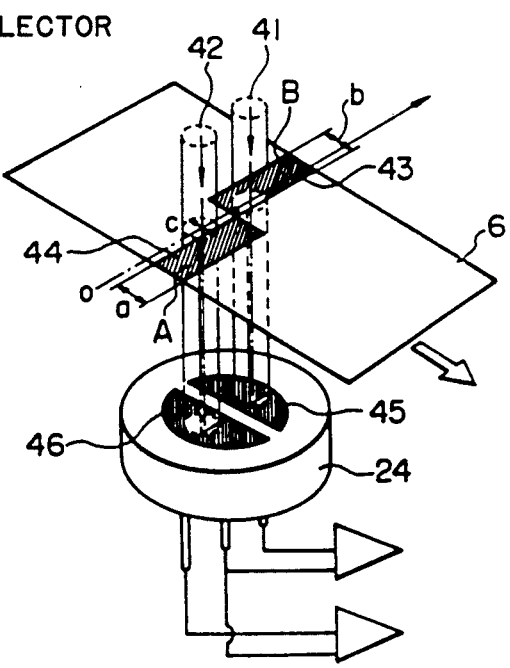
FIG. 11 is a schematic view of an eighth embodiment of the reference position detecting device employed in the encoder shown in FIG. 10.

FIG. 11 shows the details of reference position detection in the present embodiment, in which two beams 41, 42 of equal intensities divided by the mask 23 are introduced to grating patterns 43, 44 constituting the reference position detecting portion and composed of a pair of slits having a phase difference in the moving direction of the disk 6, and the transmitted beams are received by photoreceptor means 24 having two light-receiving faces 45, 46. At a certain moment in the course of movement of the disk 6, the patterns 43, 44 transmit mutually equal amounts of light beams 41, 42, and the light-receiving faces of the photoreceptor means 24 provide mutually equal output signals. In the present embodiment, the reference position signal is obtained by detecting the outputs of the photoreceptor means at said moment.

Figure 12:
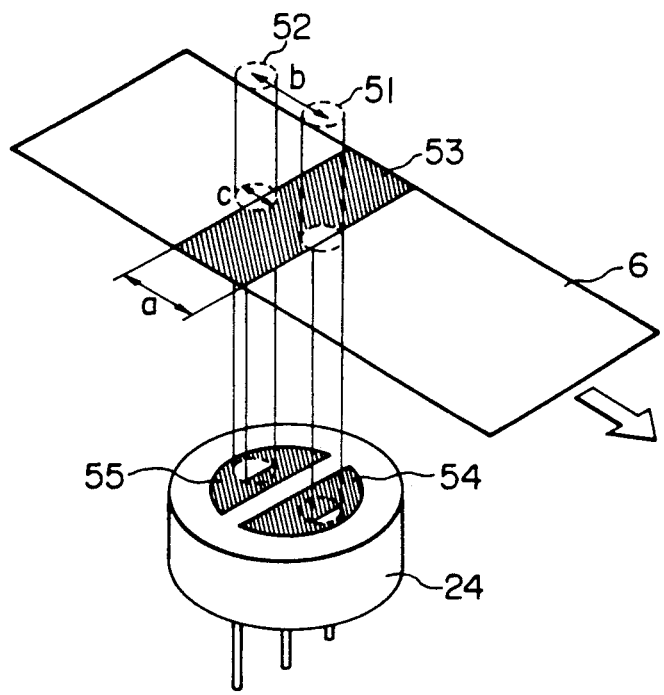
FIG. 12 is a schematic view of a ninth embodiment of the reference position detecting device of the present invention.

FIG. 12 is a schematic view of a ninth embodiment of the reference position detecting device of the present invention, wherein the mask 23 divides the light beam into two beams 51, 52 arranged parallel to the moving direction of the disk 6 in such a manner that a pattern 53 starts to release the beam 52 when an end of said pattern start to intercept the other beam 51, and the reference position is identified when the two light-receiving faces 54, 55 provide mutually equal output signals. The dimensions of the components are so selected to satisfy a relation $b-c<a<b+c$ when represented by symbols shown in FIG. 12.

Figure 13A:
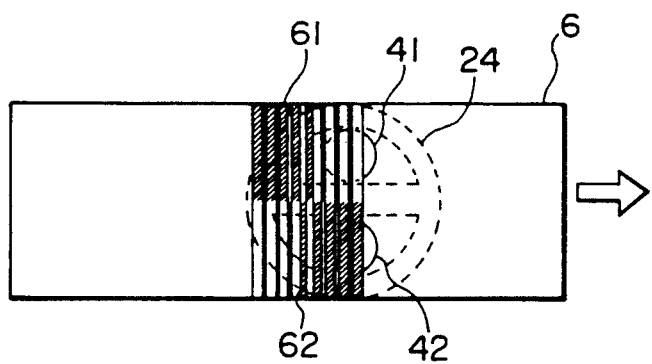
FIGS. 13A and 13B are schematic views showing a tenth embodiment of the reference position detecting device of the present invention.
Figure 13B:
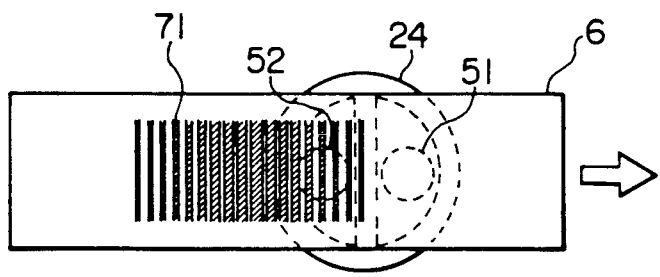

In the embodiments shown in FIGS. 11 and 12, the patterns 43, 44 employed in FIG. 11 may be replaced by grating patterns 61, 62 shown in FIG. 13A in which the grating pitch varies along the moving direction, or the pattern 53 in FIG. 12 may be replaced by a pattern 71 shown in FIG. 13B in which the grating pitch varies symmetrically.

Figure 14:
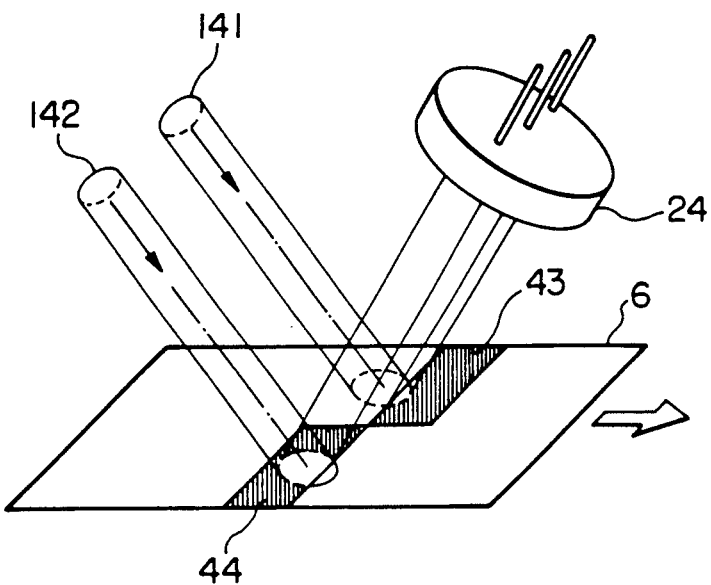
FIG. 14 is a schematic view of an eleventh embodiment of the reference position detecting device of the present invention.
Figure 15:
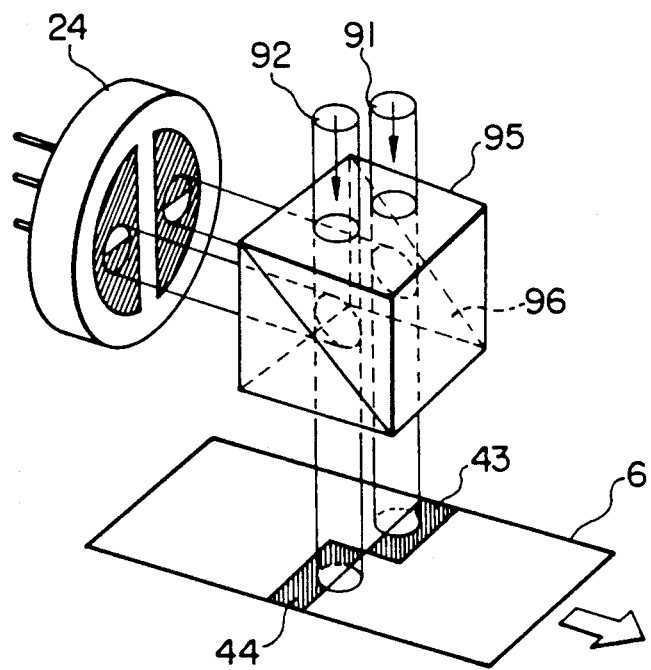
FIG. 15 is a schematic view of a twelfth embodiment of the reference position detecting device of the present invention.

The embodiment shown in FIG. 10 obtains the reference position signal from the light beams transmitted by the reference position detecting portion 22, but it is also possible to render the reflectance of the pattern different from that of the disk 6 as shown in FIGS. 14 and 15 and to utilize the reflected light beams from two patterns.

In FIGS. 14 and 15 there are shown light beams 81, 82, 91, 92, and a beam splitter 95 provided with a half mirror face 96.

In the foregoing embodiments the light beam entering the pattern may be formed as an oval or rectangular form shortened in the moving direction of the disk instead of a circular form, in order to improve the resolving power in the detection of the reference position.

Also, the object of the present invention can be achieved by constituting the disk 6 with a transparent plate and the grating pattern with opaque members.

In the present embodiment the reference position signal is obtained without a new light source, by effectively utilizing the unutilized diffracted light of a particular order obtained from the grating 7 but not utilized in the encoder, but it is also possible to directly guide a part of the light from the light source 1 to the reference position detecting portion.

Also, in case the unutilized diffracted light of a particular order is weak, a desired light intensity can be obtained by modifying the optical arrangement, for example by overlapping plural unutilized diffracted beams or by utilizing a phase diffraction grating composed of a transparent relief pattern with suitable shape and pitch to only release a 0-th order diffracted light and a desired high-order diffracted light.

Also, the foregoing embodiments employ a mask for generating plural light beams for detecting the reference position, but the use of such mask is not desirable if the diffracted beam to be utilized is weak since the mask will further reduce the light intensity. Such loss in the light intensity can be prevented by generating such plural light beams by diffraction through the use of an optical system with a transparent relief phase grating.

More specifically, suitable selection of the shape and pitch of the grating to obtain the diffracted lights of ±1 order only from the grating, thus substantially reducing the loss to zero.

In the following disclosure there will be explained the function of the encoder of the present embodiment.

In the present embodiment a rotation of the rotary object by a pitch of the diffraction grating 7 causes a change of 2 m$\pi$ in the phase of the m-th order diffracted light. Also, the phase of the n-th order diffracted light re-diffracted by the grating 7 similarly changes by 2 n$\pi$. Consequently, the photoreceptor means in total provides (2m−2n) sinusoidal waves, and the amount of rotation is detected in the present embodiment by detecting said sinusoidal waves.

As an example, in case of utilizing a diffraction grating with a pitch of 3.2 $\mu$m and utilizing the diffracted beams of a first order and minus first order, a rotation of 3.2 $\mu$m of the rotary object generates four sinusoidal waves. Thus, the resolving power per each sinusoidal wave is equal to 3.2/4=0.8 $\mu$m or a quarter of a pitch of the diffraction grating.

The present embodiment is also capable of identifying the rotating direction of the rotary object by dividing the light beam with the splitter 11 and forming a phase difference of 90° between two light beams.

The beam splitter 11, polarizers 12, 13 and a photoreceptor may be dispensed with if the measurement of the amount of rotation is enough. Also the rotating speed can be determined by measuring the frequency of the obtained sinusoidal waves.

In the present embodiment the diffracted beams from two positions M1, M2 approximately symmetrical to the center of rotation are employed to reduce the error in measurement, resulting from the aberration between the center of rotation of the rotary object and the center of the radial diffraction grating 7.

Instead of the diffracted lights from approximately symmetrical two points, diffracted beams from arbitrary plural positions may be utilized to achieve a substantially same effect. For example, the diffracted beams from three points mutually separated by 120° can be effectively utilized.

Also the influence of the wave front aberration resulting from the difference in pitch between the outside and the inside of the radial grating can be eliminated by superposing a beam component close to the rotary shaft with that of the other beam entering the approximately symmetrical position and similarly superposing the beam components of the outside.

In the present embodiment, the diffracted light of the particular order travels the same light path as that of the incident beam between the beam splitter 3 and the reflector means 8 or 9, thereby facilitating the overlapping of two diffracted light beams on said beam splitter 3 and improving the precision of assembly of the entire apparatus.

In case the precision of measurement is not critical, there can be utilized only one light beam instead of two light beams from mutually symmetrical two points.

In the foregoing embodiments, the $\frac{1}{4}$-wavelength plates 4, 5 may be placed at any positions between the beam splitter 3 and the reflector means.

Also, in the foregoing embodiments, the photoreceptor means 14, 15 may receive reflected diffracted lights instead of transmitted diffracted lights.

Naturally the diffracted lights other than those utilized for measurements and for reference position detection can be utilized for other functions.

Though the present embodiment has been limited to a rotary encoder, the technical concept thereof can also be applied to a linear encoder.

Thus, the present embodiment provides an encoder capable of easily obtaining a reference position signal of a high resolving power with a simple structure by forming grating patterns with a phase difference on a moving object, introducing two light beams into said grating patterns and receiving the light beams transmitted or reflected by at least a part of said grating patterns, thereby eliminating the influence of fluctuation in the intensity of the light source.

Also in the reference position detecting devices shown in FIGS. 11 to 15, the zero phase signal is generated in response to the detection of the center of the reference pattern, so that the reference position remains constant regardless of the moving or rotating direction of the object.

While the reference position detecting devices shown in FIGS. 3 to 9 utilize a single light beam, those shown in FIGS. 11 to 15 utilize a pair of light beams. However, the detecting principle is the same in both cases, and the zero phase signal is released when plural photoreceptors release mutually equal output signals.

Consequently, the devices shown in FIGS. 3 to 9 are preferable in consideration of the simplification of the structure.

The resolving power in the devices shown in FIGS. 11 to 15 can be improved by reducing the widths (a, b in FIG. 11) of the reference pattern.

Figure 16:
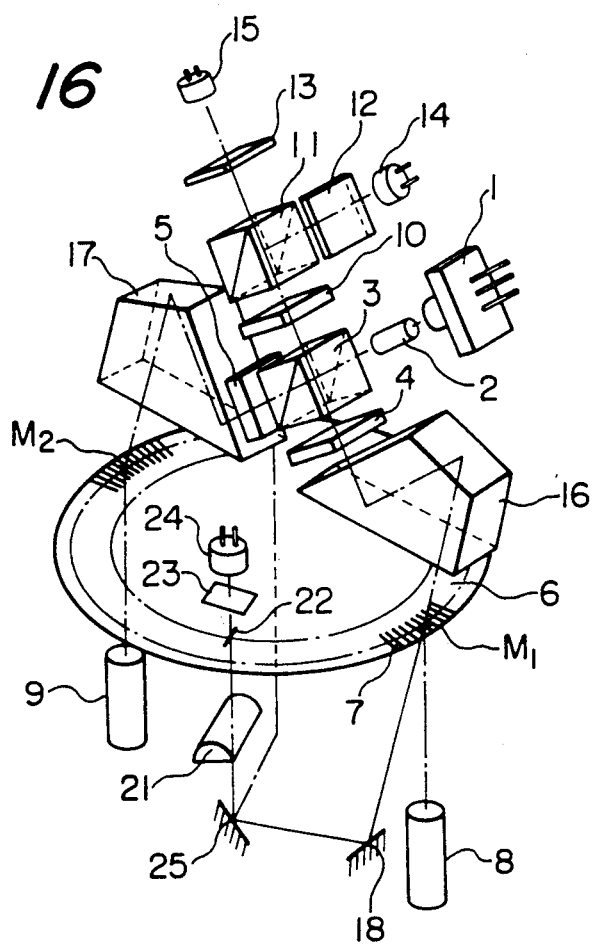
FIG. 16 is a schematic view of still another embodiment of the encoder of the present invention.

FIG. 16 is a schematic view of still another embodiment of the optical system of the present invention applied to a rotary encoder.

In this embodiment, a light beam emitted by a laser 1 is transformed into a parallel beam by a collimating lens 2 and is introduced into a beam splitter 3 to obtain two linearly polarized beams, i.e. transmitted and reflected beams, of approximately the same intensities. The reflected beam is transformed into a circularly polarized beam through a $\frac{1}{4}$-wavelength plate 4, and introduced, through a prism 16 having two reflecting faces, into a position M1 of a radial diffraction grating 7 of a disk 6 connected to a rotary object to be measured. The transmitted and diffracted light of a particular order obtained from said grating 7 is reflected by reflector means 8 to enter an approximately same position M1 of the grating 7 through the same light path. The diffracted light of a particular order obtained by re-diffraction by said grating 7 is transformed by the $\frac{1}{4}$-wavelength plate 4 into a linearly polarized beam, polarizing direction having a different by 90° from that of the incident beam, and enters the beam splitter 3.

In the present embodiment, the diffracted light of the particular order travels the same light path as that of the incident beam between the beam splitter 3 and the reflector means 8.

Referring again to FIG. 16, the light beam transmitted by the beam splitter 3 is transformed into a circularly polarized beam by a $\frac{1}{4}$-wavelength plate 5 and enters a position M2 of the grating 7 on the disk 6, approximately symmetrical to the point M1 with respect to the rotary shaft 50. The transmitted and diffracted light of a particular order from said grating 7 is reflected by reflector means 9 similar to the reflector means 8 and enters an approximately same position M2 of said grating 7, through the same light path. The diffracted light of a particular order obtained by re-diffraction by said grating 7 is transformed by the ¼-wavelength plate 5 into a linearly polarized light of which polarizing direction is different by 90° from that of the incident beam and enters the beam splitter 3.

Also, in this transmitted light beam, the diffracted light of the particular order travels the same light path as that of the incident light beam between the beam splitter 3 and the reflector means 9, as in the case of the above-explained reflected light beam. Said diffracted light is superposed with the diffracted light coming from the reflector means 8, then is transformed by a ¼-wavelength plate 10 into a circularly polarized light and is split by a splitter 11 into two light beams. These light beams are guided through polarizers 12, 13 of which polarizing directions are respectively inclined by 45° to obtain linearly polarized lights with a mutual phase difference of 90° and are introduced respectively into photoreceptor means 14, 15 for detecting the intensity of the interference fringes formed by said two light beams.

Also in the present embodiment, a light beam diffracted from the position M1 of the grating 7, for example -m-th order or (m+1)-th order, other than the light entering the reflector means 8, for example of m-th order, is guided through mirrors 18, 25 and a cylindrical lens 21 to a reference position detecting portion 22 provided on the disk 6.

Said detecting portion 22 is composed for example of a slit aperture formed on the disk 6, and the change in light intensity passing through said slit is photoelectrically detected by photoreceptor means 24 to determine the zero position.

In this manner there is obtained a reference signal, for example per each turn, for measuring the state of rotation of the disk 6.

In the present embodiment the reference position signal is obtained without a new light source, by effectively utilizing a diffracted light of a particular order obtained from the grating 7 but not utilized in the encoder.

Also, in case the unutilized diffracted light of a particular order is weak, a desired light intensity can be obtained by modifying the optical arrangement, for example by overlapping plural unutilized diffracted beams or by utilizing a phase diffraction grating composed of a transparent relief pattern with suitable shape and pitch to only release a 0-th order diffracted light and a desired high-order diffracted light.

In the present embodiment a rotation of the rotary object to be measured by a pitch of the diffraction grating 7 causes a change of 2 m$\pi$ in the phase of the m-th order diffracted light. Also, the phase of the n-th order diffracted light re-diffracted by the grating 7 similarly changes by 2 n$\pi$. Consequently the photoreceptor means in total provides (2m−2n) sinusoidal waves, and the amount of rotation is detected in the present embodiment by detecting said sinusoidal waves.

As an example, in case of utilizing a diffraction grating with a pitch of 3.2 $\mu$m and utilizing the diffracted beams of first order and minus first order, a rotation of 3.2 $\mu$m of the rotary object generates four sinusoidal waves. Thus, the resolving power per each sinusoidal wave is equal to 3.2/4=0.8 $\mu$m or a quarter of a pitch of the diffraction grating.

The present embodiment is also capable of identifying the rotating direction of the rotary object by dividing the light beam with the splitter 11 and forming a phase difference of 90° between two light beams.

The beam splitter 11, polarizers 12, 13 and a photoreceptor may be dispensed with if the measurement of the amount of rotation alone is required.

Also, in the present embodiment the error in measurement, resulting from the aberration between the center of rotation of the rotary object and the center of the radial diffraction grating 7 is reduced by employing the diffracted beams from two positions M1, M2 approximately symmetrical to the center of rotation.

Instead of the diffracted lights from approximately symmetrical two points, there may be employed diffracted beams from arbitrary plural positions to achieve substantially the same effect. For example, the diffracted beams from three positions mutually separated by 120° can be effectively utilized.

Also, the influence of the wave front aberration resulting from the difference in pitch between the outside and the inside of the radial grating can be eliminated by superposing a beam component close to the rotary shaft with that of the other beam entering the approximately symmetrical position and similarly superposing the beam components of the outside.

In the present embodiment, the diffracted light of the particular order travels the same light path as that of the incident beam between the beam splitter 3 and the reflector means 8 or 9, thereby facilitating the overlapping of two diffracted light beams on said beam splitter 3 and improving the precision of assembly of the entire apparatus.

In case the precision of measurement is not critical, there can be utilized only one light beam instead of two light beams from mutually symmetrical two points.

Figure 17:
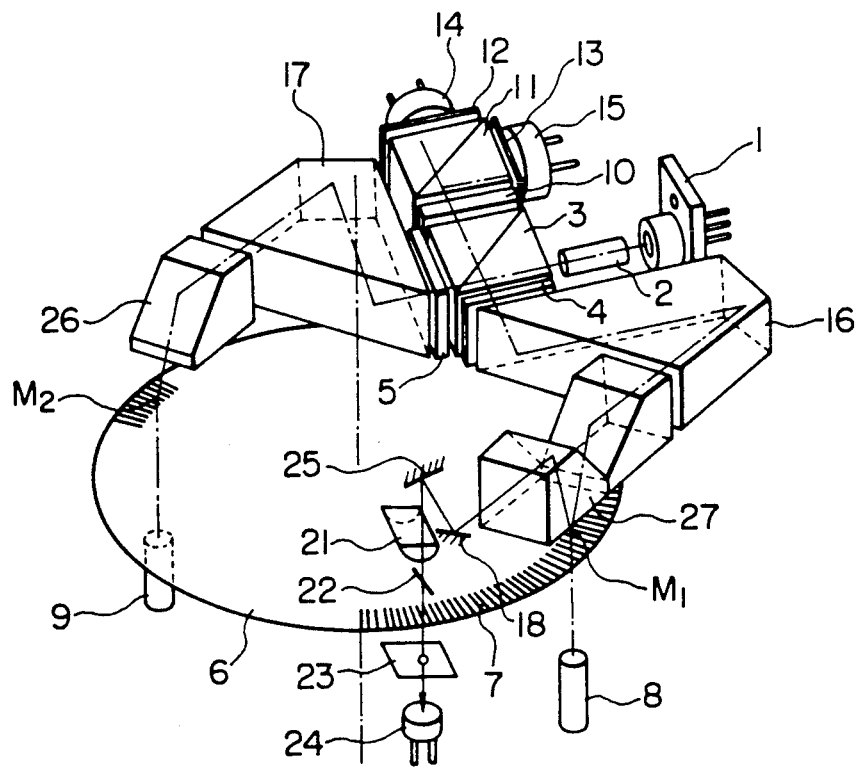
FIG. 17 is a schematic view of still another embodiment of the encoder of the present invention.

FIG. 17 is a schematic view of still another embodiment of the optical system of the present invention applied to an encoder, wherein the same components as those in FIG. 16 are represented by the same numbers.

In the present embodiment, the transmitted diffracted light of a particular order obtained from the diffraction grating 7 is introduced into reflector means 8, while the reflected diffracted light of a particular order is guided through a prism 27 having a reflecting face, two mirrors 18, 25 and a cylindrical lens 21 to the reference position detecting portion 22, and the light beam transmitted by said detecting portion 22 is received, through a mask 23, by photoreceptor means 24 to obtain a reference position signal.

Other structures are the same as those in the embodiment shown in FIG. 16.

The method of obtaining the reference position signal and the optical arrangement are not limited to those disclosed in the foregoing embodiments but can be modified in any manner, as long as an optical method is employed.

In the foregoing embodiments, the ¼-wavelength plates 4, 5 may be placed in any positions between the beam splitter 3 and the reflector means.

Also in the foregoing embodiment, the photoreceptor means 14, 15 may receive the reflected diffracted light instead of the transmitted diffracted light.

Furthermore, the diffracted beams other than those utilized for measurement and reference position detection can be naturally utilized for other purposes.

Though the foregoing embodiment has been limited to a rotary encoder, the technical concept thereof can be directly applied to a linear encoder.

In this manner, the foregoing embodiment provides an encoder capable of easily providing a reference position signal without an additional light source and with a simple structure, by utilizing a light beam other than the diffracted light of a particular order employed for measuring the moving state of a moving object.

What we claim is:

1. An encoder for detecting relative displacement between a beam spot and an optical scale on which a grating pattern and a reference pattern are formed, comprising:
   means for reading the grating pattern;
   means for irradiating the optical scale with a laser beam to form a t least one beam spot on the optical scale; and
   first and second light-receiving means for receiving the laser beam from the optical scale to output first and second signals, respectively, said first and second signals having levels which change in accordance with the positional relationship between the beam spot and the reference pattern, the levels of said first and second signals are the same only when the beam spot and the reference pattern achieve a predetermined positional relationship, wherein a predetermined reference signal is output when the levels of said first and second signals are the same.

2. An encoder according to claim 1, wherein said first and second light-receiving means receive the laser beam from different beam spots.

3. An encoder according to claim 2, wherein the different beam spots are arranged along the direction of movement of the optical scale.

4. An encoder according to claim 1, wherein said irradiating means forms first and second beam spots at different positions on the optical scale, and said first light-receiving means receives a laser beam from the first beam spot and said second light-receiving means receives a laser beam from the second beam spot.

5. An encoder according to claim 4, wherein the first and second beam spots are arranged along the direction of movement of the optical scale.

6. An encoder according to claim 4, wherein said first and said second beam spots are arranged in a direction generally normal to the direction of movement of the optical scale.

7. An encoder according to claim 1, wherein said irradiating means forms a slit-like beam spot on the optical scale.

8. An encoder according to claim 1, wherein said irradiating means directs the laser beam on the optical scale obliquely to the surface thereof.

9. An encoder according to claim 7, wherein said irradiating means comprises a semiconductor laser and a cylindrical lens for converting the laser beam to the slit-like light beam, thereby forming a slit-like spot on the optical scale.

10. An optical encoder according to claim 1, wherein said reading means includes a light source, optical means for irradiating the grating pattern with a light beam and detector means for detecting the light beam from the grating pattern.

11. An optical encoder according to claim 10, wherein said beam spot irradiating means supplies said laser beam from said light source.

12. An optical encoder according to claim 11, wherein said light source is a semiconductor laser.

13. An encoding method for detecting a reference position of an optical scale to monitor a moving state of the optical scale movable relative to a beam spot, comprising the steps of:
    providing a predetermined pattern at the reference position of the optical scale;
    irradiating the optical scale with a laser beam to form a beam spot on the optical scale;
    receiving a laser beam from the optical scale by first and second light-receiving means to detect first and second signals having levels which change in accordance with the positional relationship between the beam spot and the pattern, the levels of said first and second signals are the same only when the beam spot and the pattern achieve a predetermined positional relationship; and
    outputting a reference signal corresponding to the pattern when the levels of said first and second signals are substantially the same.

14. An encoding method according to claim 13, wherein said pattern is rectangular.

15. An encoding method according to claim 14, wherein said irradiating step forms a single slit-like beam spot.

16. An encoding method according to claim 14, wherein said irradiating step forms first and second beam spots which are arranged along the direction of movement of the optical scale, said first light-receiving means receives a laser beam from the first beam spot and said second light-receiving means receives a laser beam from the second beam spot.

17. An encoding method according to claim 14, wherein said pattern is formed of a grating pattern where a grating pitch changes along the direction of movement of the optical scale.

18. An encoding method according to claim 14, wherein said pattern is arranged in a direction substantially normal to the direction of movement of the optical scale and is formed of a first and second grating pattern, said first grating pattern having a reversed phase from that of said second grating pattern.

19. An encoding method according to claim 13, wherein said pattern is formed of a reflective film and said first and second receiving means receive only a reflected light from the optical scale.

20. An encoding method according to claim 13, wherein said pattern is formed of an opaque film and said first and second receiving means receive only a transmitted light from the object.

21. An encoding method according to claim 13, wherein said irradiating step further comprises the step of converting a laser beam from a semiconductor laser to a slit-like light beam with a cylindrical lens.

22. An encoder comprising:
    means for directing a coherent light beam to a diffraction grating formed along a direction of movement of an object and for forming diffracted light beams;
    optical means for forming interference light utilizing the diffracted light beams emerging from said diffraction grating;
    detector means for detecting change in intensity of said interference light;
    means for irradiating the object with a part of the coherent light beam so as to form a light spot on the object; and
    first and second light-receiving means for receiving the light beam from the object to output first and second signals, respectively, said first and second signals having levels which change in accordance with the positional relationship between the light spot and a reference pattern formed on the object, the levels of said first and second signals are the same only when the light spot and the reference pattern achieve a predetermined positional relationship, and a predetermined reference signal being output when the levels of said first and second signals are the same, wherein the movable state of the object is detected on the basis of said output signal of said detector means and said reference signal.

23. An encoder according to claim 22, wherein the direction of movement of the object is rotational.

24. An encoder comprising:
means for directing a first light beam to a diffraction grating formed along a direction of movement of an object and for forming diffracted light beams;
optical means for forming interference light utilizing the diffracted light beams emerging from said diffraction grating;
detector means for detecting change in intensity of said interference light;
means for irradiating the object with a second light beam, with the first light beam, so as to form a light spot on the object; and
first and second light-receiving means for receiving the light beam from the object to output first and second signals, respectively, the first and second signals having levels which change in accordance with the positional relationship between the light spot and a reference pattern formed on the object, the levels of said first and second signals are the same only when the light spot and the reference pattern achieve a predetermined positional relationship, and a predetermined reference signal being output when the levels of said first and second signals are the same,
wherein the movable state of the object is detected on the basis of said output signal of said detector means and said reference signal.

25. An encoder according to claim 24, wherein the direction of movement of the object is rotational.

26. An optical encoder for detecting a rotating state of a rotary scale, comprising:
reading means for reading a grating pattern formed on the periphery of the scale along the rotating direction of the scale;
means for forming at least one beam spot on the scale by directing a laser beam to the scale so as to detect a reference pattern formed on a predetermined position of the scale; and
first and second light-receiving means for receiving the laser beam from the scale to output first and second signals, respectively, said first and second signals having levels which change in accordance with the positional relationship between the beam spot and the reference pattern, the levels of the first and second signals are the same only when the beam spot and the reference pattern achieve a predetermined positional relationship, wherein a predetermined reference signal is output when the levels of the first and second signals are the same.

27. An optical encoder according to claim 26, wherein said reading means includes a light source optical means for irradiating the grating pattern with a light beam and detector means for detecting the light beam from the grating pattern.

28. An optical encoder according to claim 27, wherein said beam spot forming means supplies said laser beam from said light source.

29. An optical encoder according to claim 28, wherein said light source is a semiconductor laser.

30. A device for detecting a reference pattern formed on an optical scale movable relative to a beam spot, said device for use in an encoder, said device comprising:
means for supplying a laser beam;
means for irradiating the scale with the laser beam to form at least one beam spot on the scale; and
first and second laser beam receiving means for receiving the laser beam from the scale to output first and second signals, respectively, said first and second signals having levels which change in accordance with the positional relationship between the beam spot and the reference pattern, the levels of said first and second signals are the same only when the beam spot and the reference pattern achieve a predetermined positional relationship, wherein a predetermined reference signal is output in order to detect the reference pattern when the levels of the first and second signals are the same.

31. A device according to claim 30, wherein said irradiating means irradiates the scale with first and second laser beams to form a first and a second beam spot, and wherein said first laser beam receiving means receives the laser beam from the first beam spot and said second laser beam receiving means receives the laser beam from the second beam spot.

32. A device according to claim 30, wherein said supplying means includes a semiconductor laser.

33. A device according to claim 30, wherein said irradiating means directs the laser beam toward the scale through a beam splitter and wherein said first and second radiation beam receiving means receive reflected beams from the scale through said beam splitter.

34. A device according to claim 30, wherein said irradiating means causes the laser beam to be aslant incident on the scale and wherein said first and second radiation beam receiving means receive reflected beams from the scale.

35. A device according to claim 30, wherein the reference signal is used so that the displacement of the scale is detected in the encoder.

36. A reference position signal detecting device for use in a device such as an encoder, wherein said reference position signal detecting device comprises:
means for directing a radiation beam to a surface of an object on which a reference mark is formed; and
first and second beam-receiving means for receiving the radiation beam from the object to output first and second output signals, respectively, said reference position signal detecting device being arranged such that the first and second output signals respectively change in accordance with the positional relationship between the reference mark and the radiation beam when the reference mark passes across the radiation beam due to relative movement between the object and the radiation beam, and the reference position signal is detected in response to the first and second output signals becoming the same level, the levels of said first and second output signals being the same only when the light beam and the reference mark achieve a predetermined positional relationship,
wherein said directing means supplies first and second radiation beams which irradiate portions of the object which are different from each other, wherein said first beam-receiving means receives the radiation beam from the portion irradiated by the first radiation beam and said second beam-receiving means receives the radiation beam from the portion irradiated by the second radiation beam, wherein each portion irradiated by the first and second radiation beams is determined respectively so that the first output from said first beam-receiving means changes in response to the positional relationship between the reference mark and the first radiation beam and the second output from said second beam-receiving means changes in response to the positional relationship between the reference mark and the second radiation beam.

37. A device according to claim 36, wherein the reference mark is composed of a single rectangular pattern, wherein the first and second radiation beams irradiate portions of the object with an interval from one another in the moving direction of the object so as not to overlap each other, and wherein the interval between said portions is determined so that when the reference mark passes across said each portion to be irradiated, the first and second radiation beams irradiate edges of the rectangular pattern facing each other in the moving direction of the reference mark.

38. A device according to claim 36, wherein the reference mark is composed of a first and a second rectangular patterns, wherein the first and second radiation beams irradiate portions of the object with an interval in a direction differing from the moving direction of the object so as not to overlap each other, and wherein the interval between said portions is determined so that when the reference mark passes across said each portion to be irradiated, the first radiation beam irradiates the edge of the first rectangular pattern and the second radiation beam irradiates the edge of the second rectangular pattern.

39. A device according to any one of claim 36 to 38, wherein said directing means includes a laser and splitting means for splitting the radiation beam from the laser into the first and second light beams.

40. A device according to claim 39, further comprising a half mirror is provided between said splitting means and the object so that the first and second radiation beams irradiate the object through said half-mirror, and wherein said first and second beam receiving means receive the radiation beams reflected by said each portion through said half-mirror.

41. An optical encoder comprising:

reading means for reading a grating pattern formed on an optical scale;

means for forming first and second beam spots on the optical scale by directing first and second radiation beams to the optical scale so as to detect a reference pattern formed on a predetermined position of the optical scale;

a first detector for detecting the first radiation beam from the optical scale to output a first signal having a level which changes in accordance with the positional relationship between the first beam spot and the reference pattern; and a second detector for detecting the second radiation beam from the optical scale to output a second signal having a level which changes in accordance with the positional relationship between the second beam spot and the reference pattern, wherein a predetermined reference signal is output when the levels of the first and second signals are the same, the levels of said first and second output signals being the same only when the light beam and the reference mark achieve a predetermined positional relationship.

42. An optical encoder according to claim 41, wherein said beam spot forming means includes a laser for supplying the first and second radiation beams.

43. An optical encoder according to claim 42, wherein said laser is a semiconductor laser.

44. An optical encoder according to claim 42, wherein the reference pattern comprises first and second marks, and wherein the level of said first signal changes in accordance with the positional relationship between the first beam spot and the first mark, and the level of said second signal changes in accordance with the positional relationship between the second beam spot and the second mark.

45. An optical encoder according to claim 41, wherein said reading means includes a light source, optical means for irradiating the grating pattern with a light beam and detector means for detecting the light beam from the grating pattern.

46. An optical encoder according to claim 45, wherein said beam spot forming means supplies the first and second radiation beam from said light source.

47. An optical encoder according to claim 46, wherein said light source is a semiconductor laser.

48. An optical encoder according to claim 42, wherein said first and second detectors are in a single body.

* * * * *

UNITED STATES PATENT AND TRADEMARK OFFICE
CERTIFICATE OF CORRECTION

PATENT NO. : 5,059,791

DATED : October 22, 1991

INVENTOR(S) : KOH ISHIZUKA, ET. AL

It is certified that error appears in the above-identified patent and that said Letters Patent is hereby corrected as shown below:

On the Title Page, Section [56] "OTHER PUBLICATIONS"
    Line 2, change "Muchon" to --München--.

COLUMN 2
    Line 46, change "super" to --super- --.

COLUMN 4
    Line 53, change "-m-th" to --m-th--.

COLUMN 5
    Line 32, change "rom" to --from--.

COLUMN 9
    Line 31, change "splitter 1" to --splitter 11--; and
    Line 41, change "-m-th" to --m-th--.

COLUMN 12
    Line 53, change "polarizing direction having a" to --having a polarizing direction--.

UNITED STATES PATENT AND TRADEMARK OFFICE
CERTIFICATE OF CORRECTION

PATENT NO. : 5,059,791            Page 2 of 3

DATED : October 22, 1991

INVENTOR(S) : KOH ISHIZUKA, ET. AL

It is certified that error appears in the above-identified patent and that said Letters Patent is hereby corrected as shown below:

COLUMN 13

Line 4, change "of" to --having a--;

Line 5, delete "which";

Line 25, change "-m-th" to --m-th--.

COLUMN 15

Line 14, change "a t" to --at--;

Line 44, change "generally" to --substantially--.

COLUMN 16

Line 47, change "object" to --optical scale--.

COLUMN 18

Line 41, change "radiation" to --laser--.

UNITED STATES PATENT AND TRADEMARK OFFICE
CERTIFICATE OF CORRECTION

PATENT NO. : 5,059,791
DATED : October 22, 1991
INVENTOR(S) : KOH ISHIZUKA, ET. AL It is certified that error appears in the above-identified patent and that said Letters Patent is hereby corrected as shown below:

<u>COLUMN 19</u>

Line 29, change "patterns" to --pattern--;

Line 39, change "claim 36 to 38" to --claims 36 to 38--;

Line 42, change "light" to --radiation--;

Line 44, delete "is"; and

Line 47, change "beam receiving" to --beam-receiving--.

Signed and Sealed this

Sixth Day of July, 1993

Attest:

MICHAEL K. KIRK

Attesting Officer    Acting Commissioner of Patents and Trademarks